US009247057B2

(12) United States Patent
Chen et al.

(10) Patent No.: US 9,247,057 B2
(45) Date of Patent: Jan. 26, 2016

(54) SYSTEM AND METHOD FOR PROVIDING PROACTIVE SERVICE ASSURANCE IN EMERGENCY NETWORKS

(71) Applicant: Verizon Patent and Licensing Inc., Basking Ridge, NJ (US)

(72) Inventors: Ming Chen, Bedford, MA (US); George L. Hughes, Jr., Wesley Chapel, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 68 days.

(21) Appl. No.: 14/155,698

(22) Filed: Jan. 15, 2014

(65) Prior Publication Data

US 2015/0201067 A1 Jul. 16, 2015

(51) Int. Cl.
*H04M 15/00* (2006.01)
*H04M 3/51* (2006.01)
*H04M 3/22* (2006.01)

(52) U.S. Cl.
CPC .......... *H04M 3/5116* (2013.01); *H04M 3/2218* (2013.01); *H04M 3/2281* (2013.01)

(58) Field of Classification Search
CPC ..... H04M 15/00; H04M 15/58; H04M 15/41; H04M 15/44; H04M 2215/0104; H04M 3/36
USPC ............................. 379/32.01, 45, 112.01, 133
See application file for complete search history.

(56) References Cited

U.S. PATENT DOCUMENTS

| 5,606,600 | A | * | 2/1997 | Elliott et al. | ............. | 379/112.09 |
| 5,867,558 | A | * | 2/1999 | Swanson | ....................... | 379/9.03 |
| 5,999,604 | A | * | 12/1999 | Walter | ......................... | 379/133 |
| 7,324,634 | B2 | * | 1/2008 | Hoy | ....................... | H04M 3/22 |
| | | | | | | 379/133 |
| 8,503,313 | B1 | * | 8/2013 | Lang et al. | ..................... | 370/252 |
| 2002/0127993 | A1 | * | 9/2002 | Zappala | ........................ | 455/404 |
| 2008/0056144 | A1 | * | 3/2008 | Hutchinson et al. | ......... | 370/250 |
| 2009/0310757 | A1 | * | 12/2009 | Areddu | ................ | H04Q 3/0087 |
| | | | | | | 379/32.01 |

* cited by examiner

*Primary Examiner* — Quoc D Tran (57) ABSTRACT

An approach is provided for network quality assurance. The approach includes identifying a node in a calling path associated with a call between a calling party and a called party. The approach also includes querying call record information associated with the call from the node. The approach further includes analyzing the call record information to determine a successful state or a failure state of the call. The approach further includes recursively querying and analyzing other call record information associated with the call from one or more subsequent nodes based on the successful state, the failure state, or a combination thereof determined for the node, the one or more subsequent nodes, or a combination thereof.

20 Claims, 10 Drawing Sheets

SYSTEM AND METHOD FOR PROVIDING PROACTIVE SERVICE ASSURANCE IN EMERGENCY NETWORKS

BACKGROUND INFORMATION

Emergency 911 (E911) services play a critical role in maintaining order and security in society. The E911 system's usefulness is directly linked with the system's reliability. As such, network providers must be proactive in monitoring and discovering E911 network issues quickly. Unfortunately, while test calls are necessary to monitor and diagnose such issues, these test calls are intrusive to the E911 networks, potentially blocking incoming calls. Thus, network providers are challenged to continually monitor the reliability of the E911 system without blocking calls to the network. As a result, there is a need for a proactive approach in monitoring and testing of the E911 network with minimum intrusion.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for proactive monitoring and testing of the E911 network with minimum intrusion, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to proactively monitoring E911 networks with minimum intrusion, it is contemplated that these embodiments have applicability to monitoring any other type of communications network that supports calling between two parties (e.g., calling party and called party), whether or not the parties are part of an emergency or E911 network.

Figure 1:
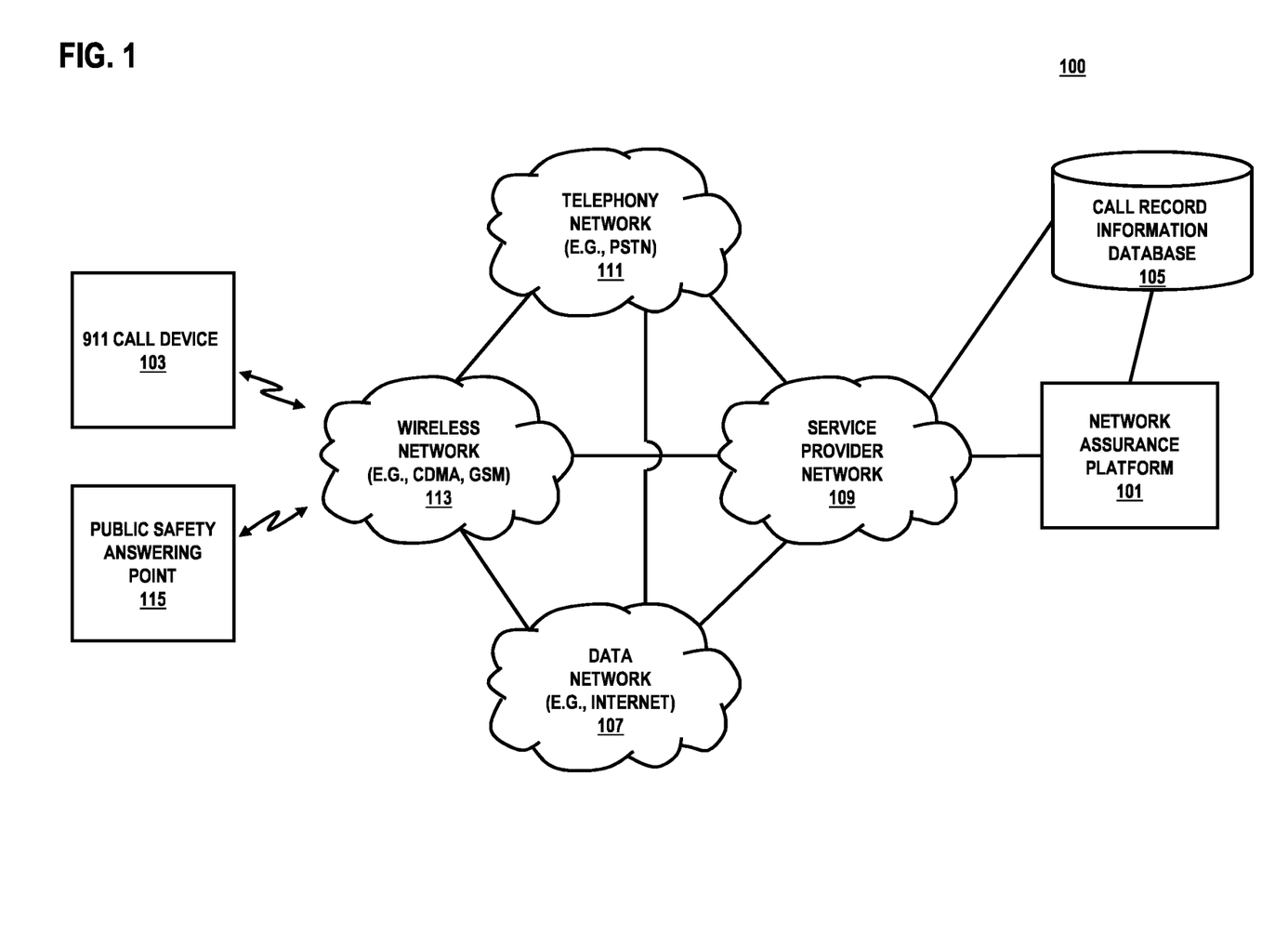
FIG. 1 is a diagram of a system capable of proactive monitoring and testing of the E911 network with minimum intrusion, according to one embodiment.

FIG. 1 is a diagram of a system capable of proactive monitoring and testing of the E911 network with minimum intrusion. From a young age, most Americans have been taught to dial 911 wherever and whenever trouble may find them. As such, this emergency line is a cornerstone to public safety. Any malfunction within the E911 network may potentially lead to dire consequences to both individuals and society as a whole. The Public Safety Answering Point (PSAP) is a government agency that answers incoming 911 calls in the United States. Therefore, service providers must work with PSAP to ensure the stability and reliability of the E911 service. In some cases, it can be obvious when a 911 network is down. For example, in large urban areas, a sudden reduction of calls may present a red flag to system operators as there are typically high volumes of E911 at most hours. However, in the case of a partial outage, the volume of calls may not be drastically lowered such that the change in volume is noticeable. Additionally, rural areas face an even greater challenge as there may not be an incoming flux of E911 calls such that a sudden reduction of calls may be alarming. Thus, the PSAP in rural areas may not rely on a significant drop in call volume as a network problem indicator, even when the networks may have sustained severe damage, such as cut cables or node hardware failures. Regardless of population density, failure to detect E911 network outages may be detrimental to public safety and security.

The tasks of network monitoring and early detection of issues are met with a number of challenges. Each service area has a limited number of service lines available. Therefore, while the most straightforward approach is to conduct test calls, such an approach may be an imposition to the limited E911 resources, potentially resulting in the blocking of 911 calls. Additionally, 911 network structures vary, ranging from wireline, wireless, and voice over internet protocol (VoIP) architectures. This diversity of network architectures presents additional technical and administrative challenges to service providers seeking to assure end-to-end E911 network availability. As such, the Federal Communications Commission (FCC) and service providers are challenged to ensure E911 network availability.

To address this problem, the system in FIG. 1 introduces the capability for a network assurance platform (herein after NAP) 101 to provide proactive monitoring and testing of the E911 network with minimum intrusion. While the instant embodiment involves an E911 network, the system 100 applies to any network upon which two endpoints may be connected through a series of switches or nodes, including wireless, wireline, VoIP, etc. In the E911 embodiment, a 911 call placed by a user typically goes through a series of nodes before arriving at the PSAP, leaving a footprint in each node in the form of call record information. A call instance is one specific call attempt on any communication network. Call record information may be a set of metadata regarding a call instance, such as, for example, a call detail record (CDR) or call data record. As the call passes from one node to the next along the calling path, each node upon which the call travels may contain identical sets of call record information reflecting the instance of the call. A calling path is the route of adjacent nodes through which the call instance must travel from its entry endpoint to its exit endpoint.

The call record information may indicate whether each call was a success or a failure. For a successful call, a network assurance query may end at the first node. For a failed call, the query may continue to successive nodes on the calling path in order to determine, for example, disconnected nodes. In this recursive process, the NAP 101 may only search for the call identifier in each node's call record information. A call identifier distills the call record information to only a few variables such that the call instance may quickly be identified. For example, a call identifier may contain the original calling number and the start time of the call because one phone number cannot make two calls at the same time. The existence of a call identifier at a node combined and a duration greater than 0 seconds may indicate success, while the absence of the call identifier or a duration less than or equal to zero may indicate failure at the node. A failure at a node indicates the connection between the node with the missing call identifier and the previous node may be disconnected. A call test may then be conducted between the two adjacent nodes with the possible connection problem, which is less intrusive to the network than an end-to-end call test.

A call test replicates events on, for example, telecom networks wherein live calls are generated to identify potential network performance issues. In some cases, a call record information may not be available. In such scenarios, an end-to-end call test must be proactively conducted. An end-to-end call test may be a call test which begins at the first endpoint in a calling path and ends at the last endpoint in a calling path. Such a test may be intrusive on the network so it is favorable to determine the time when the network is least busy to minimize intrusion. A network load model, or an algorithm capable of network load forecasting (e.g., Erlang-B, etc.), may calculate when the intrusive test should be conducted. The network load model calculations may yield a number of preferable end-to-end call test times for operators to select based on practical concerns. If the intrusive end-to-end call test confirms a network outage or hardware failure, a trouble ticket may be issued and repair may be dispatched. A trouble ticket (or trouble report) is a mechanism by which organizations may log the discovery, reporting, and resolution of some problem either in a paper and/or electronic environment.

To implement the above, the NAP 101 may periodically conduct non-intrusive call record information queries. The call record information is created for every instance of a phone call by a telephone exchange or other telecommunication equipment. The call record information contains attributes specific to that phone call or call instance. For example, a call record information may contain: the phone number of the subscriber originating the call (calling party); the starting time of the call (date and time); call duration; results of the call, indicating whether or not the call was connected; the route by which the call entered the exchange; the route by which the call left the exchange; or any other metadata variable related to the call instance. In the E911 embodiment, it is assumed that for each call, the call number dialed is 9-1-1, but the call record information may be logged for any type of network communication. In one embodiment, the system 100 via the NAP 101 may periodically query call record information in all emergency and non-emergency nodes or networks.

In an exemplary embodiment, a 911 call device 103 may make a 911 call. According to exemplary embodiments, the 911 call device 103 may be any end user device that may be utilized to communicate over the system 100 and may include any customer premise equipment (CPE) capable of sending and/or receiving information over one or more networks 107-113. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

As shown, the system 100 includes a NAP 101 implemented as, for example, part of a service provider network 109 for monitoring and testing E911 networks associated with the service provider network 109. However, in alternative embodiments, the NAP 101 could be implemented as any part of the system 100 or non-emergency networks. The NAP 101 is associated with the call record information database 105, which may be any on or off-site database that may store information such as call record information, Automatic Number Identification (ANI), and Automatic Location Identification (ALI). In one embodiment, the service provider network 109 may be a 911 high-speed network and telephone company tandem capable of connecting to the PSAP via a high-speed PSAP trunk. Further, the service provider network 109 can interact with one or more other networks, such as a telephony network 111, a data network 107, and/or a wireless network 113. In one embodiment, the telephony network 111 may be a public telephone company network and central office.

In one embodiment, the call record information database 105 can be associated with any part of the system 100, such as with the telephony network 111, the data network 107 and the wireless network 113. Additional services associated with, for example, the telephony network 111, the data network 107 or the wireless network 113, also can interact with the NAP 101, and the call record information database 105. By way of example, a service associated with the data network 107 can store call history information (e.g., call record information, ANI, ALI, etc.) in one or more call record information databases 105 associated with the service provider network 109. The NAP 101 can then summarize the call record information stored in the one or more call record information database 105.

For illustrative purposes, the networks 107-113 may be any suitable wireline and/or wireless network, and be managed by one or more service providers. For example, the telephony network 111 may include a circuit-switched network, such as the public switched telephone network (PSTN), an integrated services digital network (ISDN), a private branch exchange (PBX), or other like network. The wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of the system 100. In this manner, networks 107-113 may embody or include portions of a signaling system 7 (SS7) network, or other suitable infrastructure to support control and signaling functions.

Continuing with the exemplary embodiment above, a 911 call from a 911 call device 103 may be transferred from a number of nodes, which may be labeled as $\{N_1, N_2, N_3, \ldots, N_s\}$, where s represents the number of nodes in the calling path before reaching the PSAP 115. The PSAP 115 is usually a police, fire and/or rescue group as determined by the local municipalities. In another embodiment, the PSAP 115 may be any final endpoint on any calling path, including non-emergency calls and networks. When the NAP 101 queries call record information on the calling path, it may start from $N_1$ which is closest to the caller. In one embodiment, for each call, the NAP 101 assigns a unique call identifier for the purposes of determining a specific call instance using information from the call record information containing the calling number, C and the starting time T, as one phone number cannot make two parallel calls. The call identifier may be labeled as:

$$ID = C\_T \quad (1)$$

To determine whether each call is a success or a failure, the call record information indicates success as follows:

$$(D>0) \&\& (R == success) \quad (2)$$

The call record information indicates a failure in the following definition:

$$(D \leq 0) || (R == failure) \quad (3)$$

Based on the above equations, the standard is to take the call as a failure. The "logic and" of the two conditions required to deem a call successful are calculated to make sure that the call does get through and calculate the "logic or" of the two conditions to avoid any miss.

The result of this preliminary query will determine the next step of the network assurance monitoring. In the case of a successful test, the query is completed at the first node. If the call fails at the first switch or node, then the next switch or node must be determined from the calling path by the call record information field $N_1$. On $N_1$, it may not be necessary to go through the entire call record information, as locating the call identifier in the call record information may be sufficient. If the call identifier is found in the next node's call record information, then the line between the two nodes (e.g., the line between $N_{i-1}$ and $N_i$) is active. However, if the call identifier cannot be found in the successive node, then the line between $N_{i-1}$ and $N_i$ may require further testing. As the NAP 101 undertakes this recursive call identifier search from node to node, the system 100 may pinpoint adjacent nodes that may require further testing. For example, the case where the NAP 101 must go to the last node, $N_s$, indicates that the connection with the 911 PSAP node may have caused the failure since the $N_s$ is the last node in the calling path.

There are two scenarios where it may be necessary to conduct a test call. The first scenario is outlined above, wherein a periodic query may identify adjacent nodes that may be disconnected. In this first scenario, the test only needs to be conducted between the two adjacent nodes with the potential connection problem and is a less intrusive test (e.g., less costly to network resources). The second scenario that may trigger a call test occurs when there is no call record information for a preset period of time. The preset period of time before a call test is triggered may vary based on the call volume and/or population density of the network in question. For example, the preset period of time for an E911 network may be longer for sparsely populated rural settings (e.g., thirty minutes to an hour without a call record information) in contrast to a highly populated urban setting, wherein the preset duration of time without a call record information required to trigger a call test may be within five minutes. For this second scenario, the call test may be an end-to-end call test, as the source or sources of network errors are undetermined. Such an end-to-end call test may be more costly to network resources. Thus, in an effort to maintain network assurance without compromising network resources, a network load model may be used to calculate as less intrusive call test time. In one embodiment, an Erlang-B model is used to decide the time of the call test.

The first of two steps to determine the less intrusive time to conduct the call test requires calculating the probability that a new call is rejected because all 911 call trunks are in use. In this determination, let m be the 911 call trunk number, which is the maximum number of parallel 911 calls for a particular area, while E is the estimated inbound call load. P=B (E, m) is the probability of a new call getting rejected because all 911 trunks are busy by the following equation:

$$P_b = B(E, m) = \frac{\frac{E^m}{m!}}{\sum_{i=0}^{m} \frac{E^i}{i!}} \quad (4)$$

Once $P_b$ is determined, the 911 trunk number m may be calculated according to the estimated inbound phone call load E. Because at different times of a day, the estimated load, E, is different, to maximize quality of service, the 911 trunk number m may be assigned with a day's rush hour, which has the highest phone call load, $E_{max}$. Additionally, K represents the number of phone calls required for the call test, t is the call test time, and $E_t$ is the phone call load. The following equation shows that the resultant blocking probability will not be larger than the preset quality of service (QoS) factor, $P_b$.

$$P_{bt} = B(E_t + K, m) = \frac{\frac{(E_t + K)^m}{m!}}{\sum_{i=0}^{m} \frac{(E_t + K)^i}{i!}} \leq P_b \quad (5)$$

Operators may use the results of the above algorithm to determine less intrusive call test times. Additionally, before the call test, a query to the node may be conducted to determine the call trunk's call lines availability. If the call test confirms a network outage or hardware failure, a repair ticket may be issued and repair dispatched.

The system 100 presents a viable option for maintaining E911 networks even when such networks sustain unpredictable call volumes. The unpredictability of emergency call volumes create a unique challenge for service providers seeking to provide a reliable emergency call network. In spite of these challenges, the system 100 seeks to ensure public safety and security by monitoring and pinpointing network problems, even in rural areas, where the call volumes are often significantly less and human labor is scarce. Public safety requires regular monitoring of the availability of the E911 network. The system scans for problems automatically by querying the call record information in nodes along a calling path, thereby narrowing potential problematic sections to smaller network segments between two nodes. If a call test is necessary, a network load model may be used to determine a less busy time to conduct the call test, thereby minimizing the possibility of E911 call blocking. The potential call load of each time section in one day is predicted, and the time with the lowest call blocking probability may be selected as the call test time.

For example, in a rural town that receives 1-3 E911 calls in an hour, the NAP 101 may be configured to monitor for call record information every twenty minutes. If there is no call record information in 20 minutes, the NAP 101 may be triggered to query a record of former E911 calls, beginning with the latest call, the NAP 101 may query each call to scan for whether the call was a success or a failure. If the NAP 101 finds a call that was deemed a failure, the NAP 101 may begin to query each node or node beginning with $N_1$, as that is the node that is closest to the calling party. The NAP 101 may seek to find the call identifier in the call record information of $N_1$. If the NAP 101 locates the call identifier at $N_1$, then the NAP 101 may continue to query each successive node until the NAP 101 discovers the adjacent pair of nodes without the call identifier in question. The NAP 101 may then conduct a proactive call test between the problematic nodes. If the test confirms that there is a problem between the two adjacent nodes, then the operator may file an outage ticket for repair.

In another example involving the same rural community wherein the network assurance query may be triggered after twenty minutes without a call record information, the NAP 101 may query a failed call as determined by the Equation (3) by checking the $N_1$ for call record information. In the case there is no call record information, the NAP 101 may utilize the network load model to aid in determining scheduling a proactive end-to-end call test. If the test confirms that there is a problem with the system, then the operator may file a trouble ticket for repair.

Figure 2:
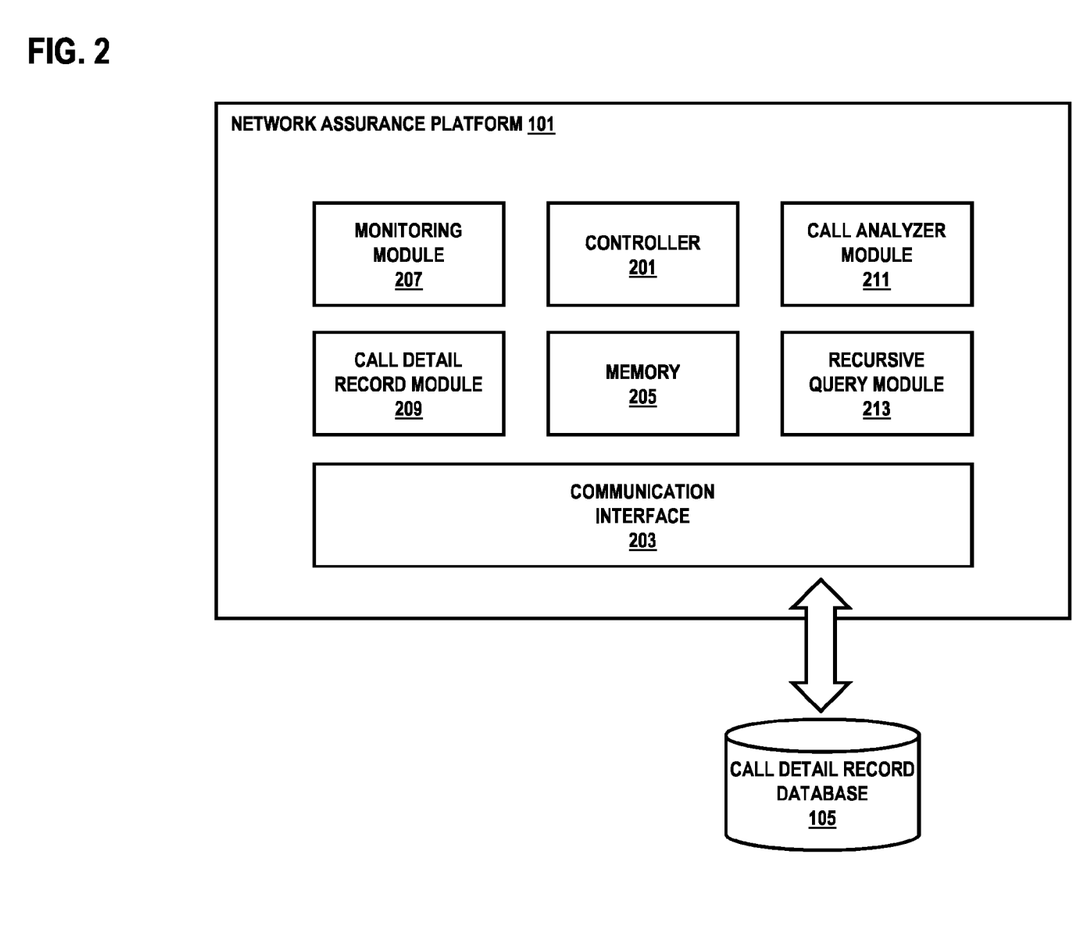
FIG. 2 is a diagram of the network assurance platform 101, according to one embodiment.

FIG. 2 is a diagram of the network assurance platform 101 capable of proactive monitoring and testing of the E911 network with minimum intrusion, according to an exemplary embodiment. Although illustrated as a separate element with respect to a service provider network 109 within the system 100, the NAP 101 may alternatively be embodied in, for example, the PSAP 115 or connected to another one of the networks 107-113. In one embodiment, the NAP 101 contains a controller 201, a communication interface 203, a memory 205, a monitoring module 207, call record information module 209, a call analyzer module 211, and a recursive query module 213. The NAP 101 may communicate with the call record information database 105 to retrieve the call record information such as calling party information, date and time of the call, call duration, results of the call (e.g., successful or failure), route by which the call entered and left the exchange, etc.

The controller 201 performs control logic functions and facilitates coordination among the other components of the NAP 101. In one embodiment, the communication interface 203 receives call history data from the PSAP 115 and provides this data throughout the NAP 101. In another embodiment, the call history data may be stored in the memory 205. After the communication interface 203 receives the data from the PSAP 115 or memory 205, the controller 201 or the communication interface 203 may transfer the data to the monitoring module 207 to determine if a query has been triggered. For example, if the PSAP 115 services a highly populated area, the threshold of time before initiating a query may be 3 minutes. As such, if the monitoring module 207 receives data that suggests that an E911 call has not been placed in the last 3 minutes, the monitoring module 207 may trigger a query with the call record information module 209.

The call record information module 209 may scan the call history provided by the PSAP 115 and the communication interface 203 to determine whether the call history contains any failed calls, starting from the most recent call. The call record information module 209 may locate the call identifier for a call instance. The call identifier may be any set of call record information variables which may identify a call instance. In one embodiment, a call identifier may be the origination call number and the call time, as one number cannot make parallel calls. For example, if the phone number 9046280000 makes a call at 10:04 PM on Jun. 5, 2013, the call record information module 209 may determine that a call from the same number, 9046280000 that made a call at 10:05 PM on Jun. 5, 2013, does not represent the same call instance because the calls did not start at the same time. In one embodiment, the call record information module 209 may additionally query the calling path by accessing the service provider network 109's network map of calling paths. As such, the call record information module may be informed regarding the servicer's calling path map.

The call analyzer module 211 determines the success of network calls. According to one embodiment, a call is successful if the duration of the call is greater than zero and the proper call identifier is recorded in the call record information. The call is a failure if the duration is less than or equal to zero or the call identifier is not in the call record information. For example, a call instance where the call identifier was present in a successive node but has a duration of 0 seconds would be deemed a failure by the call analyzer module 211 since it does not fulfill both requirements of having a duration of greater than zero and only has the call identifier in the call detail information. Alternatively, this call may be a failure as it fulfills one of the two failure requirements of having a calling duration equal to zero. This call would not have to fulfill the absence of the caller identifier because of the "logic or" of the two conditions.

The recursive query module 213 determines which node to query depending on whether a call was a failure or a success. If the call history indicates that the call was a success, the recursive query module 213 may end the query at $N_1$. If the call analyzer module 211 finds a failed call attempt, the recursive query module 213 may check successive nodes in the calling path starting with $N_1$ for a call identifier until the recursive query module 213 comes upon the node with the missing call identifier. Once the recursive query module 213 discovers the node with the missing call identifier, the recursive query module 213 has determined the pair of adjacent nodes which may require further testing.

Figure 3:
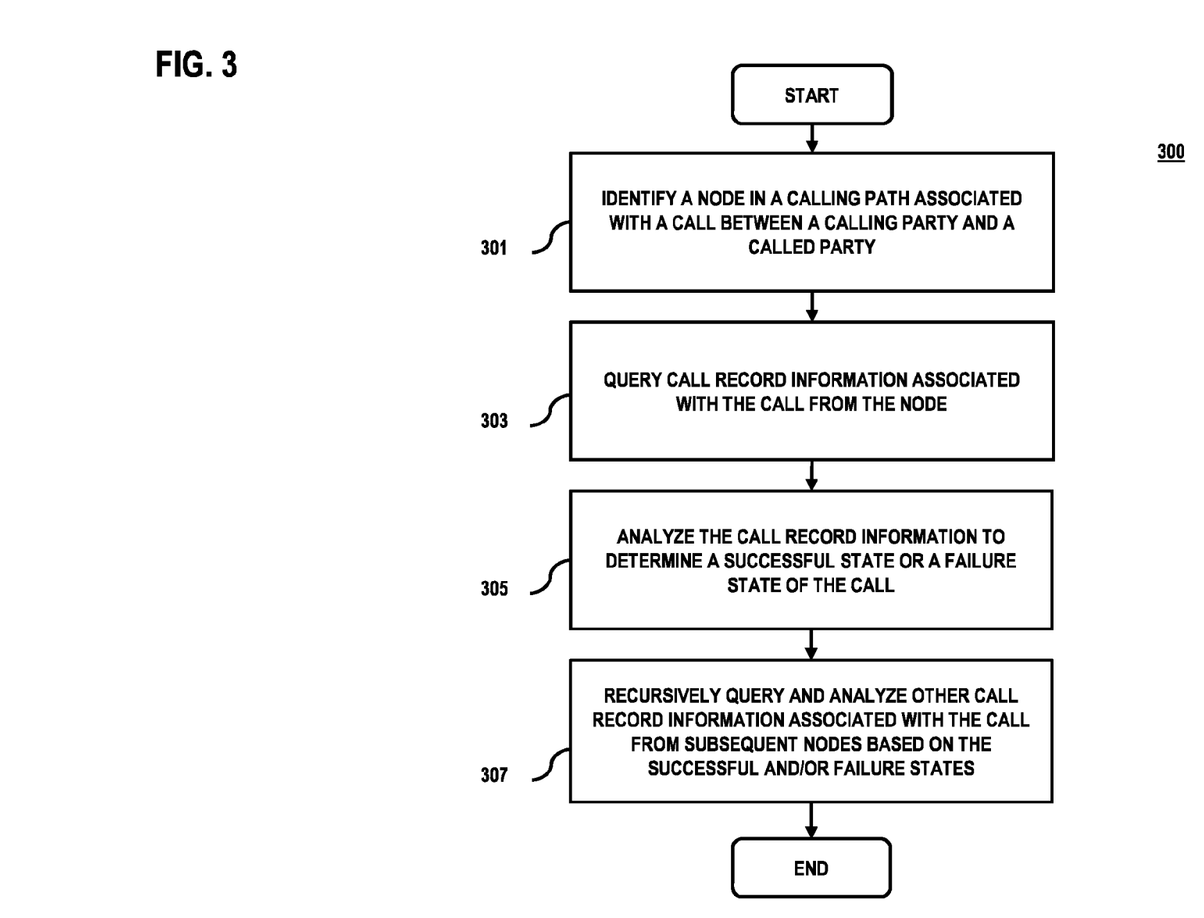
FIG. 3 is a flowchart of a process for proactive monitoring and testing of the E911 network with minimum intrusion, according to one embodiment.
Figure 10:
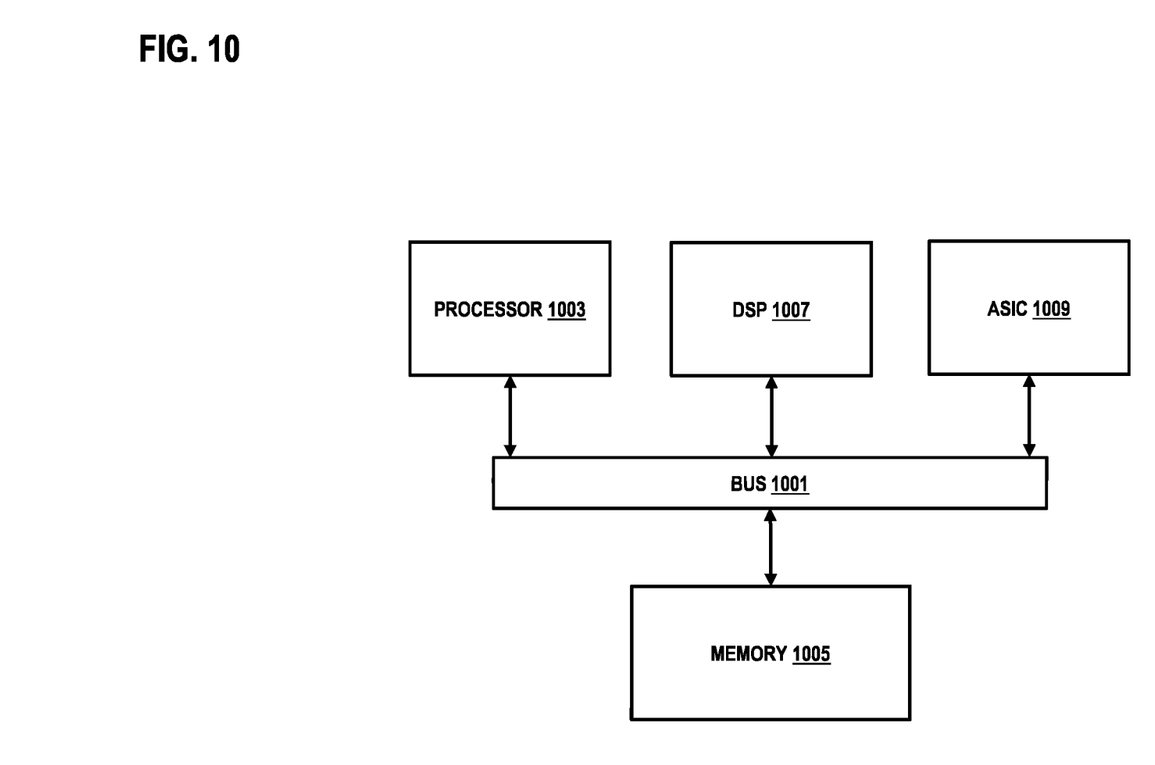
FIG. 10 is a diagram of a chip set that can be used to implement various exemplary embodiments.

FIG. 3 is a flowchart of a process for proactive monitoring and testing of the E911 network with minimum intrusion, according to one embodiment. By way of example, this authentication process is explained with respect to the NAP 101, PSAP 115, and the call record information database 105. In one embodiment, the NAP 101 performs the process 300 and is implemented in, for instance, a chip set including a processor and a memory as shown in FIG. 10. Although FIG. 3 illustrates steps 301 through 307 in a particular order, the order and number of steps is merely for explanation, and one or more steps may be performed in a different order or removed.

In step 301, the NAP 101 identifies a node in a calling path associated with a call between a calling party and a called party. A call may be any particular instance of a call, or an attempt to connect two endpoints in a network through a series of nodes or switches. A calling party initiates the call using the 911 call device 103 or any other device capable of communicating in a network. The called party represents the destination, or exit point for the initial call. In one embodiment, the called party may be the PSAP 115. In another embodiment, the called party may be a friend of the calling party.

In one embodiment, the NAP 101 may monitor nodes at various time intervals based on, for example, the volume of E911 calls received in an area or the desired turnaround time for network breakdown detection. For example, if the NAP 101 determines there has not been an E911 call for 5 minutes and 5 minutes is the preprogrammed threshold for the municipality, the NAP 101 may initiate a query on the network. In an exemplary embodiment, rural areas may require less frequent queries while densely populated areas may require more frequent queries. In another embodiment, a city that places a premium on early detection may trigger the NAP 101 to run a query every 2 minutes or run a query if an E911 has not been received in 2 minutes. The queries may be scheduled, recurring, triggered by an event (i.e., a lack of incoming E911 calls), or manually initiated. The nodes may be a switch that routes the call on a calling path to the PSAP 115. In a rural area, there may be fewer nodes in-between the node closest to the caller ($N_1$) and the node closest to the PSAP 115 ($N_s$). In one embodiment, the NAP 101 may periodically query all of the nodes in an exchange.

In step 303, the NAP 101 queries call record information associated with the call from the node. The call record information is a footprint left by the call as it is routed along the nodes on the calling path. The call record information contains information about a specific call, including: the phone number of the subscriber originating the call; the starting time of the call; call duration; results of the call indicating whether or not the call was connected; the route by which the call entered the exchange; the route by which the call left the exchange; etc. Thus, as the NAP 101 queries each node, the NAP 101 may query the data within the call record information. For example, call record information may identify an E911 call originating from the phone number 3105550011, on Jun. 25, 2013 at 12:01 PM, lasting 2 minutes, successfully connected, entering at $N_1$, and exiting the exchange at $N_s$ (where s represents the number of nodes in the calling path).

In step 305, the NAP 101 analyzes the call record information to determine a successful state or a failure state of the call. For each call, a unique identifier is needed to mark that call throughout the entire calling path. Within call record information fields, the calling number and the starting time of the call may represent the call identifier as two calls cannot be made at the same time. The NAP 101 may use the information in the call record information to determine whether the call was a success or failure. The success or failure determination may be defined any number of ways. In one embodiment, the NAP 101 may determine the success or failure of a call by observing the duration of the call and whether a call identifier was located and a failure may be defined as when the duration is less than or equal to zero or if the call identifier was not located in one of the calling path's nodes.

In step 307, the NAP 101 recursively queries and analyzes other call record information associated with the call from one or more subsequent nodes based on the successful state, the failure state, or a combination thereof determined for the node, the one or more subsequent nodes, or a combination thereof, wherein at least one of the calling party and the called party is an emergency network endpoint, and wherein the call record information and other call record information include a calling party field and a call start time field, the method further comprises identifying the call using a call identifier based on the calling party field and the call start time field. The NAP 101 may query a call by determining whether the call was a success or a failure. As previously mentioned, the definitions of success and failure may vary depending on the desired function of the network. Often, at least one determination of success or failure may be based on the metadata captured in the form of call record information. The NAP's 101 course of action may be dependent on the call instance's success or failure determination. If the call instance was deemed a success per the definition of a successful call, the NAP's 101 query may be completed at the first node. If the NAP 101 determines that the call instance was a failure, the NAP may query the node adjacent to the first node to determine the existence of a call identifier or any other requirement checks for a successful call. This type of recursive query may be especially useful to E911 networks as the query itself is less intrusive on network resources than a call test.

Figure 4:
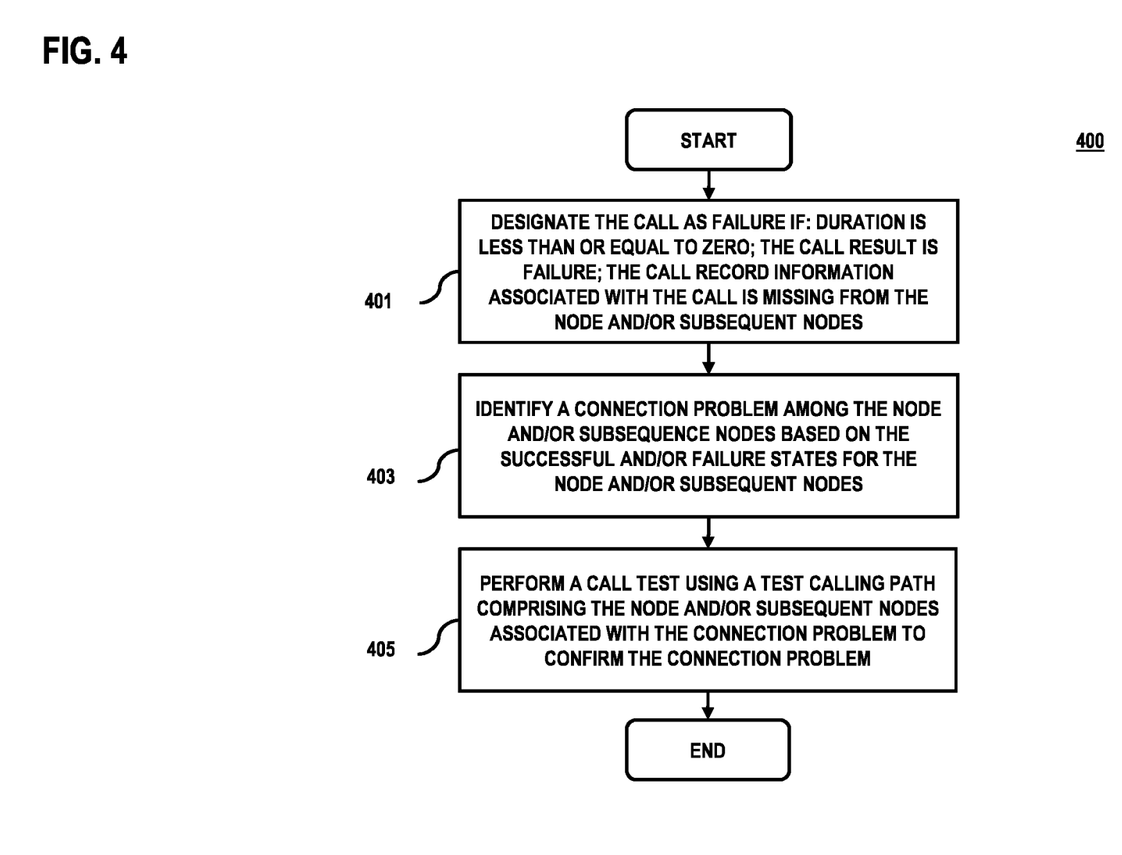
FIG. 4 is a flowchart of a process for querying and testing nodes based on call success or failure, according to one embodiment.

FIG. 4 is a flowchart of a process for querying and testing nodes based on call success or failure, according to one embodiment. In one embodiment, the NAP 101 performs the process 400 and is implemented in, for instance, a chip set including a processor and a memory as shown in FIG. 10. Although FIG. 4 illustrates steps 401 through 405 in a particular order, the order and number of steps is merely for explanation, and one or more steps may be performed in a different order or removed. In step 401, the NAP 101 designates the call as having the failure state if (a) the call duration field indicates a value less than or equal to zero; (b) the call result field indicates a failure value; (c) the call record information, the other call record information, or a combination thereof associated with the call is missing from the node, the one or more subsequent nodes, or a combination thereof; or (d) a combination thereof. In one example, the call identifier may be defined as a duration of greater than 0 seconds and the presence of the call identifier in all of the nodes on the calling path, wherein the call identifier may be defined as the origination number and the call time. For example, if the NAP 101 may query a call instance wherein the call identifier is located at each node on the calling path but the call duration is 0 seconds. The NAP 101 would deem such a call instance a failure because it does not fulfill the requirements for a successful call (e.g., (D>0)&&(R==success)). The call result field is a flag that informs whether the call was successfully connected and may be a factor in call success or failure determinations. The call record information may contain data which helps determine the success or failure of a call, such as the origination number, the call time, call location, etc.

In step 403, the NAP 101 identifies a connection problem among the node, the one or more subsequent nodes, or a combination thereof based on the successful state, the failure state, or a combination thereof determined for the node, the one or more subsequent nodes, or a combination thereof. A connection problem may encompass any hardware and/or software between and/or including two nodes along a calling path of a call instance wherein the data transmitted from one node may not have been transferred to an adjacent node. Generally, a connection problem may reference any malfunction in the system. In one example, a call instance may be determined a failure, prompting the NAP 101 to begin its query into the failed call instance's calling path. If the NAP 101 identifies the call identifier in node 3, but not in node 4, the NAP 101 may deem a connection problem between nodes 3 and 4.

In step 405, the NAP 101 performs a call test using a test calling path comprising the node, the one or more subsequent nodes, or a combination thereof associated with the connection problem to confirm the connection problem. A call test may be the NAP's 101 replication of call instances on communication networks initiated by the network to insure network performance and identify possible network failures. Call tests may be triggered by a preset event (e.g., a period of time without a call instance, a period of time without a call record information, call result field indicating failure, etc.), routinely scheduled, or manually initiated. The calling path may be randomly chosen, part of a system-wide call test, or a calling path with one or more failed calls in its history. The calling path is the series of nodes upon which the call instance traveled to get from the first endpoint to the destination endpoint of the call. The call test may involve only a pair of adjacent nodes or the call test may be an end-to-end call test, involving all of the nodes in the call instance.

The NAP 101 may schedule and conduct proactive call tests ordered by network operators. The NAP 101 may receive specific dates, times, and number of calls as input from an operator. In another embodiment, the NAP 101 may be given a set of parameters upon which to schedule a call test. For example, the NAP 101 may receive parameters such as May 15, 2013 between 2:00 PM and 5:00 PM, run 3 test calls for calling path x, wherein x represents the calling path in question (e.g., missing call record information).

Figure 5:
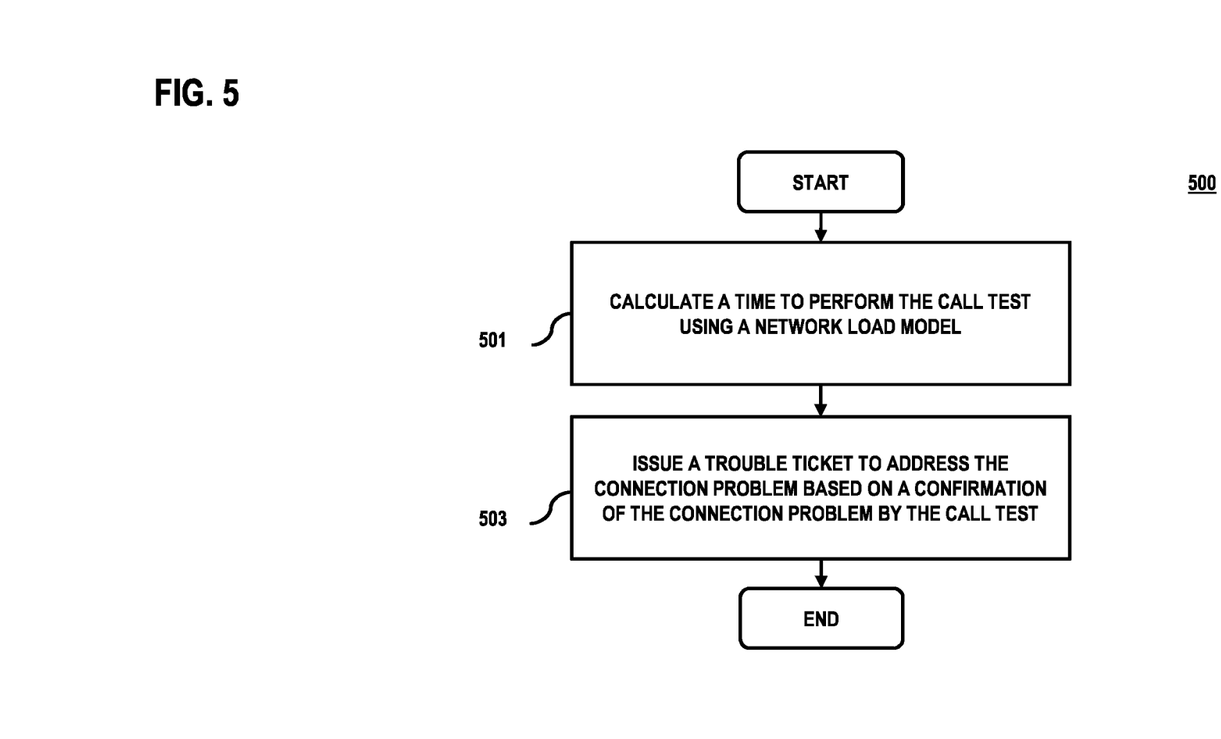
FIG. 5 is a flowchart of a process for calculating the least intrusive time to make a call test and addressing any problems that come up during the call test, according to one embodiment.

FIG. 5 is a flowchart of a process for calculating the least intrusive time to make a call test and addressing any problems that arise during the call test, according to one embodiment. In one embodiment, the NAP 101 performs the process 500 and is implemented in, for instance, a chip set including a processor and a memory as shown in FIG. 10. Although FIG. 5 illustrates steps 501 through 503 in a particular order, the order and number of steps is merely for explanation, and one or more steps may be performed in a different order or removed. In step 501, the NAP 101 calculates a time to perform the call test using a network load model, wherein the network load model includes an Erlang-B model. In one embodiment, the call record information module 209 may conduct a proactive test between problematic nodes with or without using a network load model, such as the Erlang-B model QoS prediction, depending on the level of intrusiveness of the proactive call test. For example, for an intrusive test between two adjacent problem nodes, the NAP 101 determines the least intrusive time to conduct the proactive calling test. Conversely, for a test which will not be intrusive to the E911 network, the NAP 101 may initiate the call test without using a network load model.

In one embodiment, the NAP 101 may extract relevant data from the call record information, calculate the less intrusive times upon which a call test may be conducted, and present a series of options for the operators to choose the best call times after factoring practical concerns. The NAP 101 may first determine the likelihood a call to the PSAP 115 may be rejected due to all 911 trunks being busy by the Equation (4):

$$P_b = B(E, m) = \frac{\frac{E^m}{m!}}{\sum_{i=0}^{m} \frac{E^i}{i!}} \quad (4)$$

Wherein $P_b$ is the likelihood a call to the PSAP 115 may be rejected due to all the 911 trunks being busy, E is the estimated inbound phone call load, m is the maximum number of parallel 911 calls for the dedicated area which is calculated according to the estimated inbound phone call load E. Since E may vary depending on the time of day, $E_{max}$ denotes the time of day with the highest call load. K represents the number of phone calls required for the call test (e.g., 1, 3, 4, etc.) The resultant blocking probability may not be larger than the preset QoS factor, which is $P_b$ as shown in Equation (5).

$$P_{bt} = B(E_t + K, m) = \frac{\frac{(E_t + K)^m}{m!}}{\sum_{i=0}^{m} \frac{(E_t + K)^i}{i!}} \leq P_b \quad (5)$$

Once the NAP 101 calculates the times of the day that would be least intrusive to network resources, the operators may select the option that best fits their practical concerns.

In step 503, the NAP 101 issues a trouble ticket to address the connection problem based on a confirmation of the connection problem by the call test. A trouble ticket (or trouble report) is a mechanism by which organizations may log the discovery, reporting, and resolution of some problem either in a paper or an electronic environment. After conducting the call test, the NAP 101 may present the raw test data to the operator for further analysis. In another embodiment, the NAP 101 may identify one or more potential areas of concern for further investigation. For example, the NAP 101 may present a list of failed calls as determined by the failure definition, call duration, and/or the call result field. In yet another embodiment, the NAP 101 may determine the cause and location of the problem. For example, the NAP 101 may present a trouble ticket listing one or more adjacent nodes which may present a connection problem. In another example, the trouble ticket may present the results of one or more call tests.

Figure 6:
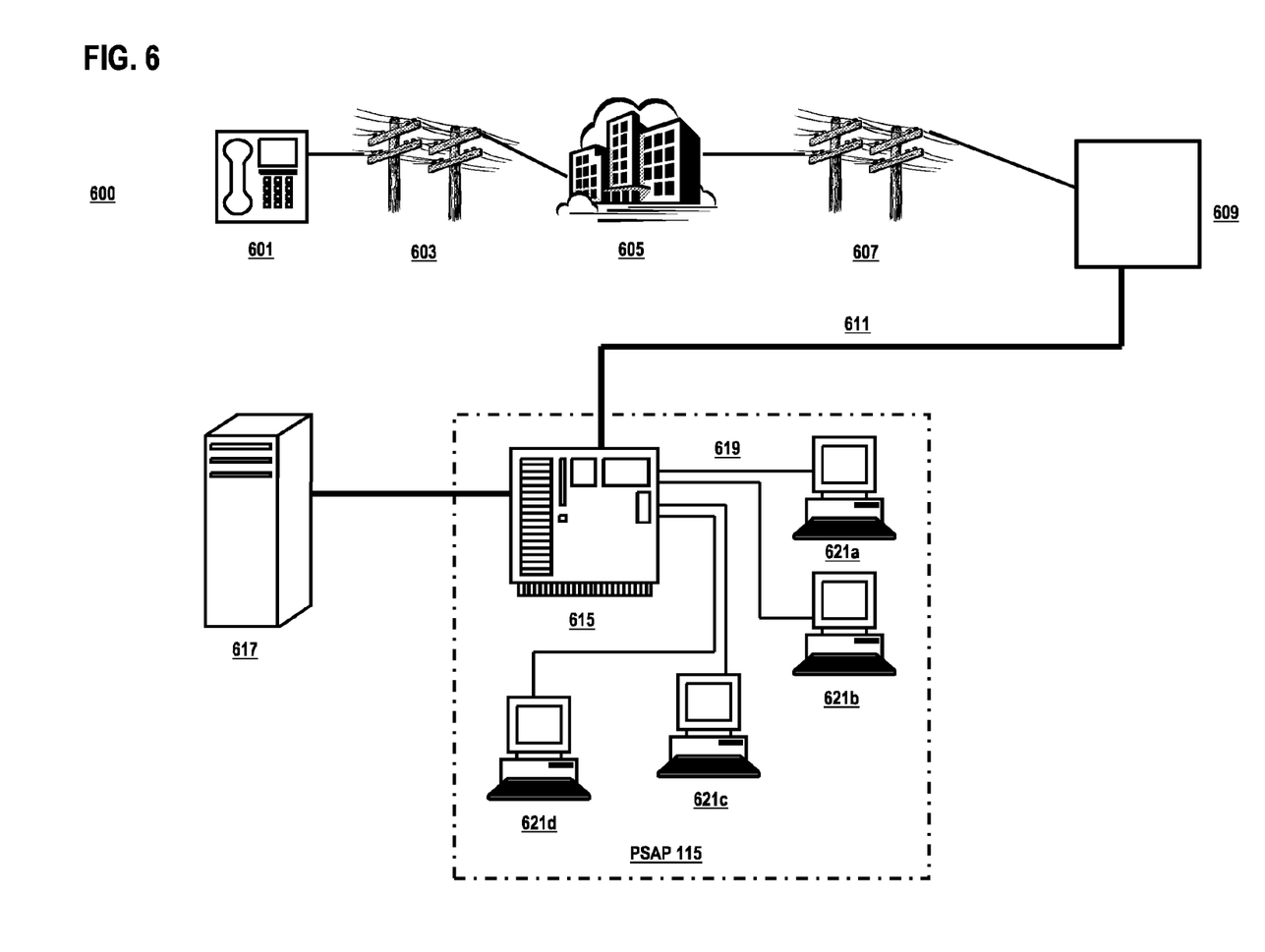
FIG. 6 is a diagram of 911 call routing in a wireline network, according to one example embodiment.

FIG. 6 is a diagram of 911 call routing in a wireline network, according to one embodiment. The system 600 is one possible set up for an E911 wireline network, wherein a 9-1-1 call 601 is placed and this call instance is carried through public telephone network 603 to telephone company central office 605 before getting to 911 high speed network 607. The telephone company tandem 609 connects the call to the PSAP 115 through the high-speed PSAP trunk 611. The 911 PSAP equipment 615 receives the call first before routing the call through the ANI/ALI offsite database 617 and is communicated via high speed PSAP 115 trunk 619. The ANI corresponds to the subscriber's seven digit phone number and displays this information on the ANI display console (not shown). The ALI identifies and displays a 911 subscriber caller address. Like with the ANI, the PSAP also displays the ALI on a screen. The 911 PSAP Equipment 615 may route the incoming 911 calls to different 911 call-takers 621*a*-621*d*.

Figure 7:
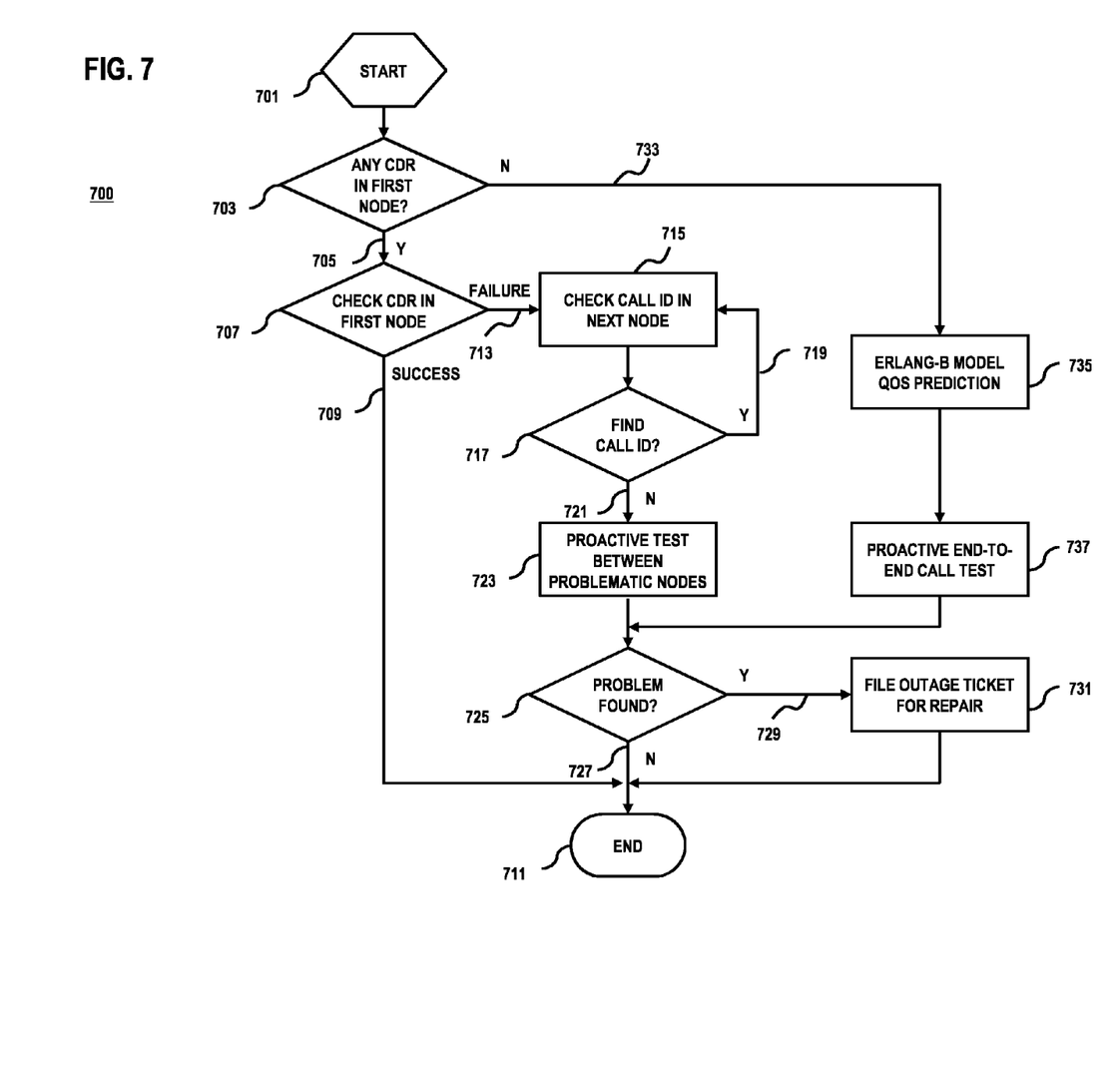
FIG. 7 is a flowchart of an E911 service assurance work flow, according to one example embodiment.

FIG. 7 is a flowchart of an E911 service assurance work flow, according to one example embodiment. Although FIG. 7 illustrates steps 701 through 737 in a particular order, the order and number of steps are merely for explanation, and one or more steps may be performed in a different order or removed. In step 701, the NAP 101 may respond to any number of events which may trigger a test query. For example, no call had been received within the predetermine threshold for the population density (e.g., no call received for 10 minutes). Additional triggers for initiating a query may be preset routine queries (e.g., daily, weekly, monthly, etc.) or unscheduled queries, which may have been manually initiated by an operator. In step 703, the NAP 101 may determine whether call record information exists in a first node ($N_1$), or the node which is closest to the caller. In step 705, the process yields a positive identification of the existence of call record information in the first node. In step 707, the NAP 101 scans the call record information of the first node to determine whether the call was a success or failure. In step 709, the call was successful. In step 711, the query is completed upon the successful call determination.

In step 713, the NAP 101 determines that the call record information within the node reports a failed call. In step 715, the NAP 101 may check for the call identifier in the next node closest to the node from which the call originated on the calling path. In step 717, the NAP 101 looks for the call identifier in the call record information. If the NAP 101 has found the call identifier, then in step 719, the NAP would check for the call identifier in the next node in the calling path. If the NAP 101 determines the call identifier does not exist in the node, as in step 721, then the NAP 101 must conduct a proactive test between the problematic nodes (step 723). Step 725 determines whether a problem was found. If the call test was successful, then there is no problem (727) and ends the query (711). However, if a problem is found, as in step 729, then a trouble ticket for repair may be issued (step 731).

In step 703, where is no call record information in the first node (step 733), the network load model (step 735) must determine a time when the test call would be least intrusive to the network (e.g., when the volume of calls are relatively lower). Based on step 735, the NAP 101 may present different call test times based on the network load model. The operator may select from the suggested call times based on practical concerns. In step 737, the NAP 101 may conduct the proactive end-to-end call test. The NAP 101 may then determine if there is a problem, per step 725. If there is no problem, and the test call is successful, as per step 727, then the query may end as per step 711. However, if there is a problem, as per step 729, then the operator may file a ticket for repair (step 731). According to another embodiment, the NAP 101 may render a trouble ticket notification or otherwise prompt the operators to fill out an outage ticket.

Figure 8A:
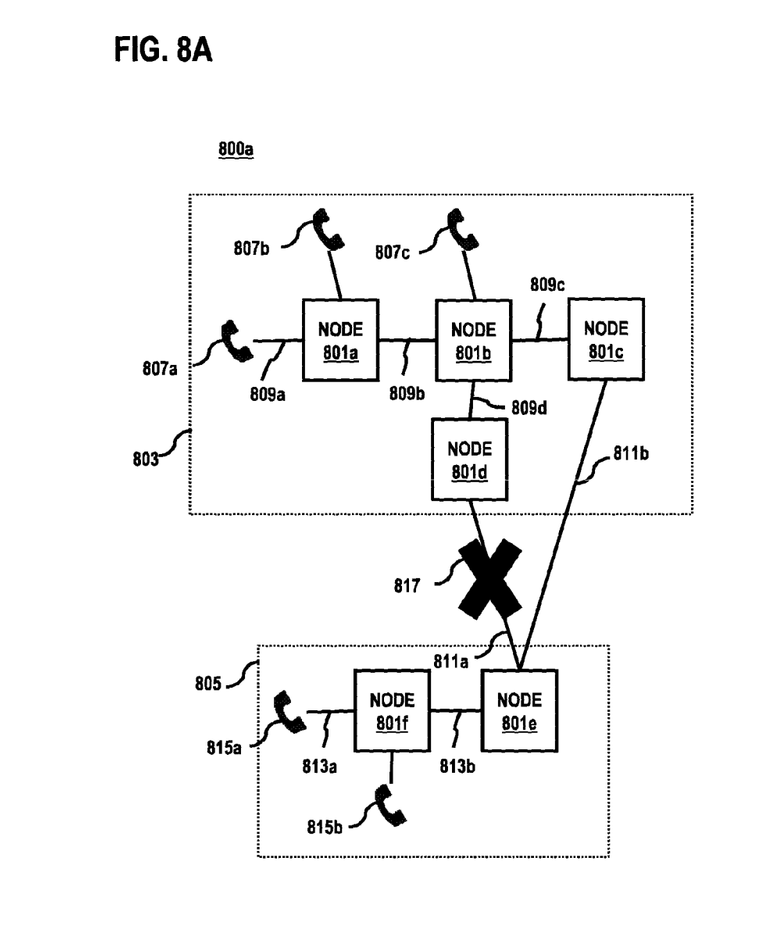
FIGS. 8A-8B are diagrams of an example network error and corresponding trouble ticket, according to one example embodiment.
Figure 8B:
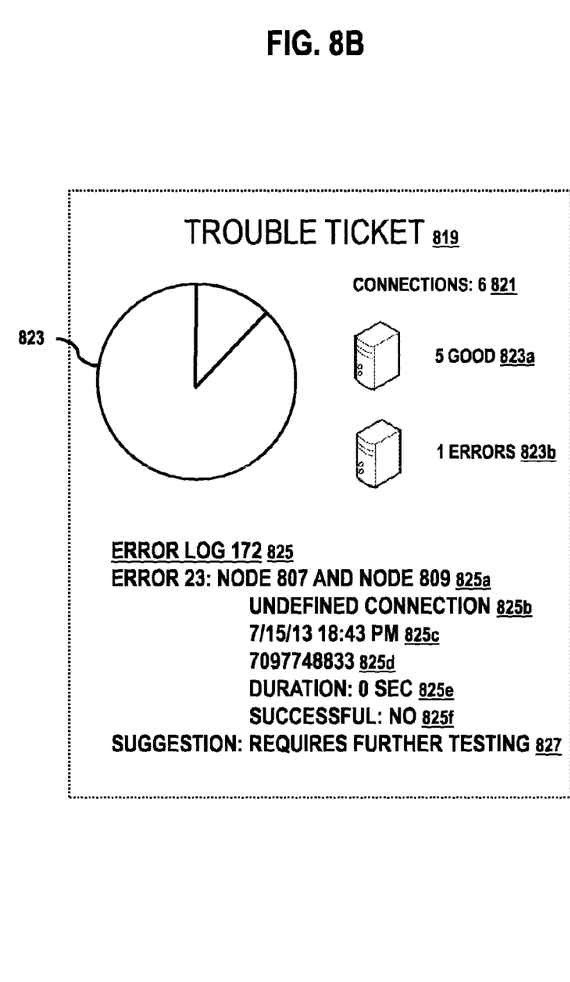

FIGS. 8A-8B are diagrams of an example network error and corresponding trouble ticket, according to one embodiment. FIG. 8A is a diagram of a layout of a network 800a's subscribers, nodes and connections. Nodes 801a-801f (cumulatively referred to as nodes 801) provides the switching function for network 800a. Service area 803 is serviced by nodes 801a-801d and service area 805 is serviced by nodes 801e-801f. Subscribers 807a-807c enters the network 800a via nodes 801a or 801b. The nodes in service area 803 are connected via the lines 809a-809d. Service area 805 is serviced by nodes 801f-801d and has subscribers 815a-815b, who connect via node 801f via lines 813a-813b. The two service areas 803 and 805 are connected via lines 811a-811b. A query into a failed call between subscriber 807a (calling party) and subscriber 815a (called party) has determined that the call identifier was located only in nodes 801a, 801b, 801d, and no call identifier was found in nodes 801e or 801f, after a recursive query. As a result, the NAP 101 has determined that further investigation or testing must be conducted upon possible connection problem 817.

FIG. 8B is an example embodiment of a trouble ticket reflecting the connection problem 817 discovered by the query between subscriber 807a and 815a. In one embodiment, the trouble ticket may be on paper. In another embodiment, the trouble ticket may be an electronic user interface or a pop-up notification. The trouble ticket may be labeled as such per the title 819. There may be a summary of the network in question with information such as the number of connections in the network (821) and a pie chart (823) representing functioning (823a) and nonfunctioning (823b) connections. In one embodiment, a summary of the error may be presented, starting with the error number (825) and details of the nodes with the connection problem (825a). The connection problem details may be listed (825b) along possible call identifiers such as the call time (825c) or calling party number (825d). Further, the information supporting the call's success or failure may also be presented, such as the duration (825e) and the success determination (825f). Finally, a suggestion for the next step toward a resolution may also be presented (827).

Figure 9:
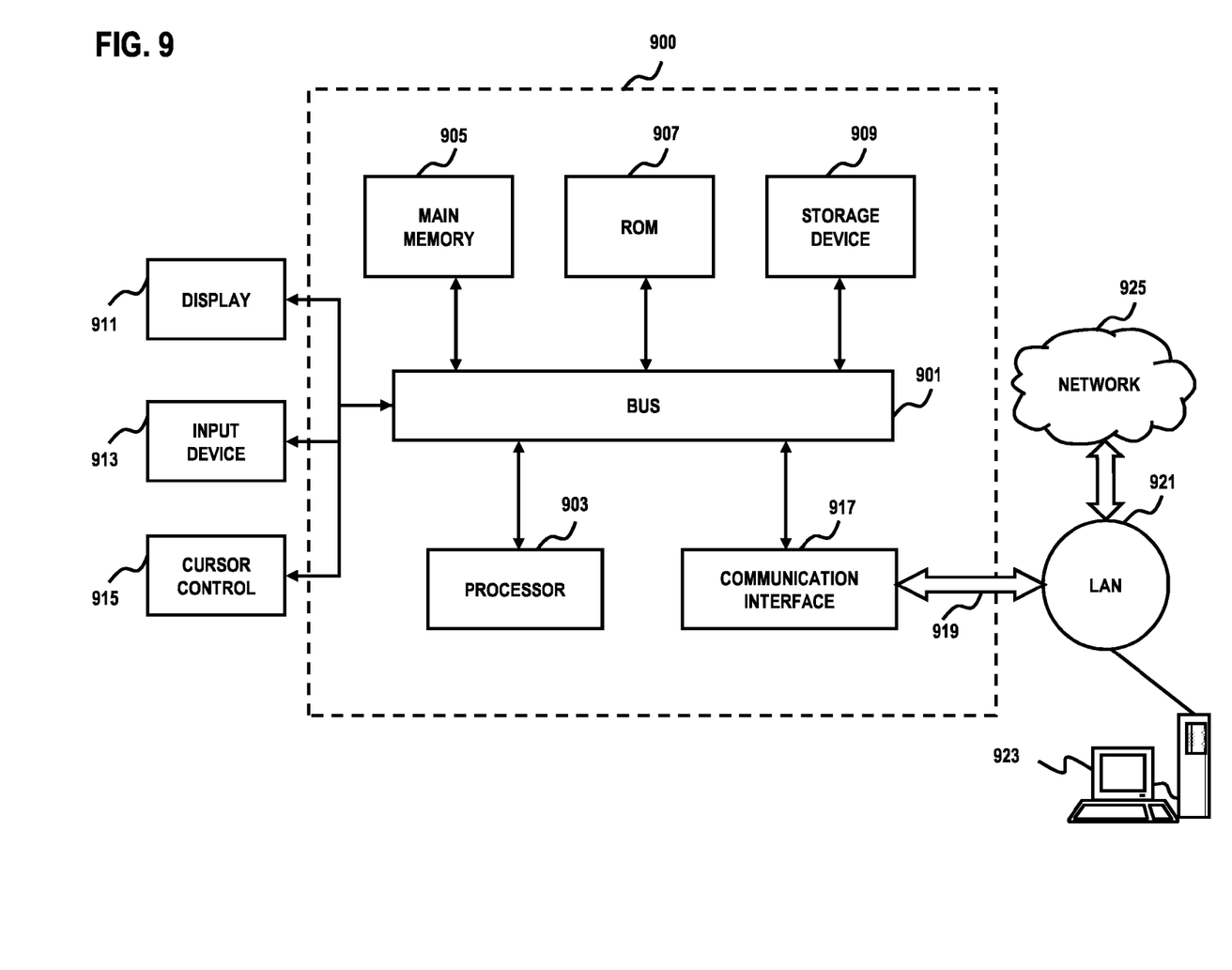
FIG. 9 is a diagram of a computer system that can be used to implement various exemplary embodiments.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

FIG. 9 is a diagram of a computer system that can be used to implement various exemplary embodiments. According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an ISDN card, a cable modem, a telephone modem, or any other communication interface to provide a data communication connection to a corresponding type of communication line. As another example, communication interface 917 may be a LAN card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a WAN or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a PDA or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 10 illustrates a chip set 1000 upon which an embodiment of the invention may be implemented. Chip set 1000 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 3-5.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    identifying a node in a calling path associated with a call between a calling party and a called party;
    querying call record information associated with the call from the node;
    analyzing the call record information to determine whether the call was successful;
    recursively querying and analyzing other call record information associated with the call from one or more subsequent nodes when it is determined that the call was not successful; and
    determining whether a connection problem exists based on the other call record information.

2. A method of claim 1, wherein at least one of the calling party and the called party is an emergency network endpoint.

3. A method of claim 1, wherein the call record information and the other call record information include a calling party field and a call start time field, the method further comprising:
identifying the call using a call identifier based on the calling party field and the call start time field.

4. A method of claim 1, wherein the call record information and the other call record information include a call duration field and a call result field, the method further comprising:
determining that the call was successful if the call duration field indicates a value greater than zero and the call result field indicates a success value.

5. A method of claim 4, further comprising:
determining that the call was not successful if one or more of:
the call duration field indicates a value less than or equal to zero;
the call result field indicates a failure value; or
the call record information or the other call record information associated with the call is missing from the node or the one or more subsequent nodes.

6. A method of claim 1, further comprising:
identifying a location of the connection problem, when it is determined that the connection problem exists, based on the call record information or the other call record information, wherein the location of the connection problem identifies adjacent nodes.

7. A method of claim 6, further comprising:
performing a call test using a test calling path comprising the location of the connection problem to confirm the connection problem.

8. A method of claim 7, further comprising:
calculating a time to perform the call test using a network load model,
wherein the network load model includes an Erlang-B model.

9. A method of claim 8, further comprising:
issuing a trouble ticket to address the connection problem based on a confirmation of the connection problem by the call test.

10. An apparatus comprising;
a processor configured to:
identify a node in a calling path associated with a call between a calling party and a called party;
query call record information associated with the call from the node;
analyze the call record information to determine whether the call was successful;
recursively query and analyze other call record information associated with the call from one or more subsequent nodes when the call was not successful; and
determine whether a connection problem exists based on the other call record information.

11. An apparatus of claim 10, wherein at least one of the calling party and the called party is an emergency network endpoint.

12. An apparatus of claim 10, wherein the call record information and the other call record information include a calling party field and a call start time field, and wherein the processor is further configured to:
identify the call using a call identifier based on the calling party field and the call start time field.

13. An apparatus of claim 10, wherein the call record information and the other call record information include a call duration field and a call result field, and wherein the processor is further configured to:
determine that the call was successful if the call duration field indicates a value greater than zero and the call result field indicates a success value.

14. A apparatus of claim 13, wherein the processor is further configured to:
determine that the call was not successful if one or more of:
the call duration field indicates a value less than or equal to zero;
the call result field indicates a failure value; or
the call record information or the other call record information associated with the call is missing from the node or the one or more subsequent nodes.

15. An apparatus of claim 10, wherein the processor is further configured to:
identify a location of the connection problem, when it is determined that the connection problem exists, based on the call record information or the other call record information, wherein the location of the connection problem identifies adjacent nodes.

16. An apparatus of claim 15, wherein the processor is further configured to:
perform a call test using a test calling path comprising the location of the connection problem to confirm the connection problem.

17. An apparatus of claim 16, wherein the processor is further configured to:
calculate a time to perform the call test using a network load model,
wherein the network load model includes an Erlang-B model.

18. An apparatus of claim 17, wherein the processor is further configured to:
issue a trouble ticket to address the connection problem based on a confirmation of the connection problem by the call test.

19. A system comprising:
a platform configured to:
identify a node in a calling path associated with a call between a calling party and a called party;
query call record information associated with the call from the node;
analyze the call record information to determine whether the call was successful;
recursively query and analyze other call record information associated with the call from one or more subsequent nodes when the call was not successful; and
determine whether a connection problem exists based on the other call record information.

20. A system of claim 19, wherein the call record information and the other call record information include a call duration field and a call result field, and wherein the platform is further configured to:
determine that the call was successful if the call duration field indicates a value greater than zero and the call result field indicates a success value; and
determine that the call was not successful if one or more of:
the call duration field indicates a value less than or equal to zero;
the call result field indicates a failure value; or
the call record information or the other call record information associated with the call is missing from the node or the one or more subsequent nodes.

* * * * *